J. G. CORBETT.
Snap-Hooks for Harness.

No. 149,291. Patented April 7, 1874.

Witnesses
Byron Sims
Sidney Marks

John G. Corbett
by E. Thurlow his atty
in fact

UNITED STATES PATENT OFFICE.

JOHN G. CORBETT, OF PRINCEVILLE, ILLINOIS.

IMPROVEMENT IN SNAP-HOOKS FOR HARNESS.

Specification forming part of Letters Patent No. 149,291, dated April 7, 1874; application filed November 26, 1873.

*To all whom it may concern:*

Be it known that I, JOHN G. CORBETT, of the town of Princeville, in the county of Peoria, in the State of Illinois, have invented an Improved Snap-Hook for Harness; and do hereby declare that the following is a full, clear, and exact description thereof, reference being had to the annexed drawings, making a part of this specification, in which like letters of reference refer to like parts, and in which—

Figures 1, 2, 3:
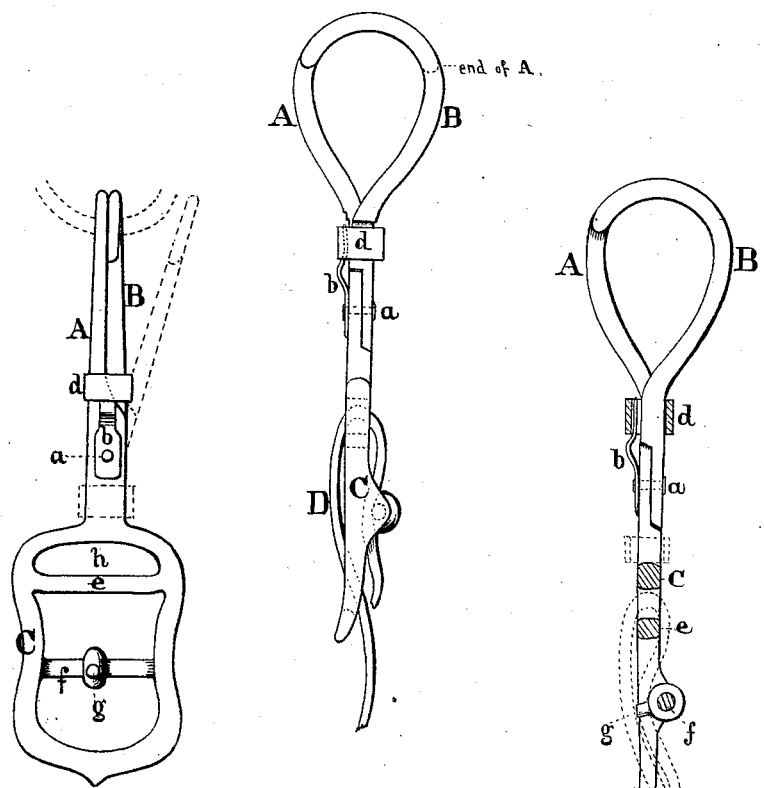
Figure 4:
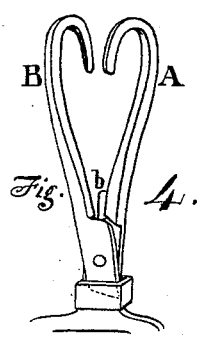

Figure 1 represents a front view, Fig. 2 side elevation, Fig. 3 sectional elevation, Fig. 4 perspective view, of the hook alone opened.

This invention consists in the construction of snap-hooks for harness without a closing spring, or one which acts immediately on one of the arms of the hook to keep the loop closed, this form being liable to derangement and inaction from dirt or rust. The hook is made in two half-loops, fitting reversely against each other and lapping, making a full loop. One half is pivoted to the other half at the base, and instead of sliding one upon the other to open, or expanding a part of the loop, as in most snap-hooks, the pivoted half of the hook opens directly away from its fellow, similar to tongs, sufficiently to admit the desired ring, staple, or other attaching place, and the two are closed and fastened by a sliding collar inclosing the stems of the two half-hooks, which is retained in place by a spring or dog.

A represents, in the drawings, the main part of the snap-hook, which part is, in form, a hook, terminating at the opposite end in a strap-holding fastening, C, which is a frame with two cross-bars, *e f*, the latter, *f*, being set back from one surface of the frame to allow the strap D to pass, and to which to secure it by a hole, which admits a nipple, *g*, projecting from said bar as far as the surface of the frame opposite to that on which said bar is situate.

The stem of the hook A, between the frame C and the hook, is flattened, and recessed in a reverse plane from that of the hook or loop, to receive the short stem of its companion hook B, which is here pivoted so that these parts can be opened to move directly away from each other, as seen in Figs. 2 and 4, to admit the bridle-ring or other attachment. The base of the hook B is prevented from opening more than requisite by its retention in the collar *d*, when the latter rests upon the shoulder of the frame C, as seen in Fig. 4. The collar *d* is a ring or tube, or similar device, which slides upon the stems of the hooks, inclosing a small spring, *b*, which is retained by the pivot-rivet *a* and points toward the loop A B. The spring is made with a shoulder or bend from its true line to retain the inclosing collar *d* when the latter is forced up to the origin of the loop to keep the two parts of the hook closed. The spring may be substituted by any simple retainer.

The frame C or strap-fastening is no essential part of the hook, and I make the latter with or without the former, retaining only the ring part *e h* for the passage of rein, bridle, or strap. When the frame C is used the strap is retained in the manner shown in Fig. 3.

What I claim as my invention is—

The hook A B, constructed in two parts, pivoted one to the other with a pin, *a*, which lies on the same plane as that of the loop of the hook, and closed by a sliding collar, *d*, secured by a spring, *b*, substantially as described.

In testimony that I claim the foregoing improvement in snap hooks, I have hereunto set my hand this 12th day of November, 1873.

JOHN G. CORBETT.

Witnesses:
JAMES M. MORSE,
HENRY W. WELLS.